Patented Oct. 31, 1939

2,177,903

UNITED STATES PATENT OFFICE 2,177,903

ORGANIC ESTERS OF CELLULOSE AND METHOD OF MAKING THE SAME

Herbert E. Martin, Cumberland, Md., assignor to Celanese Corporation of America, a corporation of Delaware No Drawing. Application February 2, 1938, Serial No. 188,320

2 Claims. (Cl. 260—230)

This invention relates to stabilized organic esters of cellulose and to the process of preparing same whereby there are obtained esters of cellulose which are stable and which when dyed with dyestuffs having an affinity therefor are fast to light and acid fading. The invention relates more particularly to the preparation of organic esters of cellulose wherein the stabilization is effected by the use of magnesium salts and the time of treatment is just prior to or concurrent with the precipitation of the cellulose ester from the ripening solution.

An object of the invention is the economic and expeditious production of organic esters of cellulose that do not deteriorate or break down upon standing and which may be dyed with dyes having an affinity therefor to produce dyed products which are faster to light and acid fading than cellulose esters prepared without the chemical stabilizing process. Another object of the invention is the production of stabilized organic esters by a process requiring less time, smaller and fewer pieces of apparatus and therefore less space than processes for stabilizing precipitated cellulose esters heretofore known. Other objects of the invention will appear from the following detailed description.

In the process of treating organic esters of cellulose the esterification of the cellulose is usually performed by treating the cellulose with an organic acid anhydride in the presence of an organic acid diluent or solvent for the ester of cellulose being formed and a catalyst such as sulphuric acid. After completion of the esterification of the cellulose, there results a homogeneous viscous solution and water may then be added in amounts sufficient to convert any organic acid anhydride remaining into the corresponding acid whereupon, usually after the addition of more water, the cellulose ester is permitted to hydrolyze or ripen to develop the desired solubility characteristics. Water and/or other non-solvent for the cellulose ester may then be added in sufficient amounts to precipitate the cellulose ester from solution. The cellulose ester is then washed to free it of acids as much as possible.

Thus, in making cellulose acetate by the above method, i. e., by the so-called solution method, cellulose is acetylated by means of acetic anhydride and a catalyst in the presence of large amounts of acetic acid which dissolves the cellulose acetate that is formed to produce a very heavy viscous solution. To this solution is added water, the solution is then allowed to stand until it develops the proper solubility characteristics. This solution after hydrolysis or ripening is usually streamed or poured into water which dilutes the acetic acid to such an extent that it is no longer capable of holding the cellulose acetate in solution causing the cellulose acetate to precipitate. However, since the solution of cellulose acetate is very viscous, the water acts on the particles or streams thereof to precipitate the outer layers of the same to produce a sort of case hardening effect, with the result that catalysts and reagents as well as impurities which were present in the solution are only with difficulty removed from the formed cellulose ester by washing.

In place of adding the organic ester of cellulose to water, the water may be added to the solution with or without the aid of mechanical or inert gaseous agitators, or other methods of precipitation may be employed and other precipitants than water may be used, although even then a certain amount of reagent and impurities are trapped in the particles of cellulose ester.

Cellulose acetate which has been manufactured in the presence of sulphuric acid or certain other compounds as catalyst is unstable. It appears to be perfectly satisfactory when first manufactured but in the course of time articles made therefrom deteriorate. This is, of course, a very serious disadvantage in such articles and it becomes necessary to adopt methods of stabilizing the cellulose acetate. The deterioration is in part due to the presence of very small quantities of acid compounds in the cellulose acetate and the origin of these compounds is probably as follows. During the acetylation process sulphuric acid or other acid catalysts reacts to a certain extent with the cellulose or the cellulose acetate or intermediate products and gives rise to very complex substances which are known as sulphoacetates of cellulose. The exact nature of these substances is hard to determine, yet it is known that these sulpho-acetates break down and liberate free acids which is one of the causes of deterioration. These compounds that contain sulphur impair the stability of the cellulose ester and impart thereto the tendency to decompose and discolor. There may also be formed cellulose derivatives that tend to decompose and break down in the presence of the sulphur compounds. Certain forms of these decomposition products tend to greatly affect dyed cellulose derivative materials so that they fade quickly when exposed to light and acid. This light and acid fading of dyed cellulose derivative compounds is appreciably noticeable when the dye employed contains primary or secondary amines.

By treating cellulose esters according to this invention the cellulose esters are more stable, have a high heat test, that is, they may be heated to a relatively high temperature without decomposing or charring, and have enhanced spinning properties. The cellulose esters produced by the method of this invention have a heat test of from 10 to 20% higher than cellulose esters produced by non-chemical stabilizing means. The cellulose esters prepared according to this invention may be spun into filaments, their solutions having good spinning stability. The cellulose esters of this invention also have an improved clarity which is unexpected as a part of the chemical stabilizing agent remains in the cellulose ester.

The organic esters of cellulose prepared according to this invention and which are dyed by any suitable dye having an affinity therefor are exceptionally stable in the presence of light and industrial gases. Yarn and fabric made from filaments formed of such cellulose esters are dyed evenly and to the same extent by water-insoluble dyes, as the same type of material prepared by other methods of stabilizing. Cellulose acetate that has been chemically stabilized in accordance with this invention has substantially the same delustering properties as cellulose acetate of the same acetyl value prepared by non-chemical stabilizing processes.

In accordance with this invention, organic esters of cellulose are stabilized by adding thereto suitable magnesium salts at the time of precipitation or toward the end of the ripening period if a ripening process is employed. Thus, while beating in the water or other non-solvent necessary to precipitate the cellulose ester there is added a magnesum salt such as magnesium carbonate, magnesium citrate and magnesium acetate or similar basic magnesium salts, which salts are well dispersed through the gel or solution, and when precipitation occurs some of it is retained by the cellulose ester to promote stability. A quantity of the magnesium salt should be employed to sufficiently neutralize all of the sulphur compounds present in the cellulose ester solution at the time of precipitation. The magnesium salt may be beaten into the solution of cellulose ester just prior to precipitation or several hours before precipitation. Other methods of precipitation and addition of the stabilizing agent may be employed. Thus the stabilizing agent may be mixed with a ripening solution while or prior to pouring or extruding the same into a precipitating bath. The stabilizing process of this invention, also, may be employed in connection with cellulose esters which are to be precipitated from their primary solution prior to ripening.

This invention may be employed in the making of any organic ester of cellulose. Examples of such organic esters of cellulose are cellulose acetate, cellulose formate, cellulose propionate and cellulose butyrate. These cellulose esters may be of any acidyl value and may be produced under conditions to effect the solubility, hardness, clarity, etc., for the purpose intended. These organic esters of cellulose may be used to form filaments, films, foils, press mass powder, plastic lacquers, etc.

Cellulose in any suitable form, such as cotton, cotton linters, wood pulp, prepared by either the sulphite or soda process, reconstituted cellulose, etc., may be employed in making the cellulose esters. This cellulose may be activated by pretreatment with lower fatty acids or with alkali, etc. The esterifying agent may be acetic anhydride, formic acid, propionic anhydride, or butyric anhydride, depending upon the ester of cellulose to be formed.

The esterification may be carried out in the presence of a suitable catalyst such as sulphuric acid, sodium bisulphate, methyl sulphate or a mixture of these with each other or with other catalysts, such as zinc chloride, hydrochloric acid, phosphoric acid, etc. It is not necessary in order to carry out the process of this invention that a sulphur bearing catalyst be employed as sulphur compounds are formed in the freshly formed cellulose ester, said sulphur compounds being derived from impurities in the reagents used as well as in certain constituents of the cellulose. While it is preferable to employ acetic acid as the diluent or solvent for the cellulose ester to be formed, any other suitable organic acid may be employed such as, for example, propionic acid and butyric acid. The sulphur present in the esterifying mixture, which sulphur may be in the free state, in the form of sulphur acids or salts, or in the form of compounds of sulphur formed by the rearrangement or breaking down of sulphur bearing compounds, are combined with the reagents present to form sulpho-esters or tends to form compounds of cellulose which are affected by light, heat and acid. These compounds are difficult to remove and greatly decrease the stability of the final product.

If a ripening of the cellulose ester is desired, there may be added during the hydrolyzing or ripening period small quantities of organic salts which aid in reducing the formation of unstable compounds. Examples of such salts are aluminum chloride and zinc chloride. In certain cases sulphuric acid may be employed as an aid in reducing the formation of unstable compounds. The addition of such materials may permit of the reduction of the amount of catalyst used in the esterification mixture and/or the ripening solution, or they may cause the production of a cellulose ester differing from that which would be produced had they not been added.

Any of the basic magnesium salts may be employed, such as magnesium carbonate, magnesium citrate and magnesium acetate or mixtures of these salts. The amount of salt used should be sufficient to neutralize or react with all the sulphur compounds present, these sulphur compounds being calculated as $SO_4$. Although a part of the sulphuric compounds may be neutralized with sodium, potassium or aluminum carbonate or acetate prior to the addition of the magnesium salts, it is preferred to employ only the magnesium salts. While aluminum acetate may be employed with the magnesium salt to produce commercially suitable products, the employment of sodium or potassium salts prior to the addition of the magnesium salt is found to reduce greatly the efficiency of the magnesium salt and in some cases to reduce the efficiency to a point where successful stabilization is not obtained.

After addition of the magnesium salt to the solution of the cellulose ester heat may be applied thereto prior to precipitation. Any degree of temperature may be employed from below room temperature to above the boiling point of the organic acid used as the solvent for the cellulose ester.

It is preferable to beat into the cellulose ester a solution or dispersion of the magnesium salt in an acid corresponding to that used as a solvent for the cellulose ester. Thus, in cases where acetic acid is employed as the solvent for the cellulose ester it is preferable to add a dispersion of magnesium carbonate or a solution of magnesium acetate in a liquid containing about 80% acetic acid and 20% water. The magnesium salt in the dispersion or solution may be of any suitable concentration. However, it is found preferable to use concentrations from 1 part by weight of magnesium salt to 3 parts of the acid-water to 1 part of magnesium salt to 8 parts of the acid-water. The amount of this solution or dispersion added to the cellulose ester will naturally be governed by the amount of sulphur compounds present therein. The amount may vary, however, from slightly below the theoretical amount of magnesium salt to react with all the sulphur present figured as $SO_4$ to 1½ times the theoretical amount necessary. Commercial magnesite may be employed instead of a more chemically pure compound if the magnesite is dissolved in acetic acid and the insoluble matter removed. The time the magnesium salt is allowed to react with the solution of cellulose ester may vary from a short time as when the salt is added just prior to precipitation to from 3 to 16 hours or more as when, after the addition of the salt, the solution is allowed to stand before precipitation. The temperature of the solution of cellulose ester during this reaction period may be from 0° to above 35° C., but is preferably maintained at about 22° C. for the greater part of the time.

After the cellulose ester has been precipitated it may be washed with water to remove the compounds formed during the reaction and also the excess acids. Obviously some of the magnesium compound formed during the reaction will remain in the cellulose ester. This, however, does not produce a haze nor as a general rule does it reduce the clarity of the cellulose ester.

For the purpose of describing the invention and not with the intention of being limited thereto, the following example is given:

Example

A solution of cellulose acetate ready for precipitation is mixed with magnesium acetate in an amount equal to 1.5 times the molecular equivalent of the sulphuric acid present. The solution of cellulose acetate is allowed to react with the magnesium salt for from 3 to 16 hours at 22° C. Water is then added to the cellulose acetate, with vigorous stirring, until precipitation occurs. The precipitated cellulose acetate may then be thoroughly washed by passing the same counter-current to a stream of water. The cellulose acetate so formed is found to stand a heat test of about 240° C.; it is clear; it has good spinning properties and it is found to be exceptionally stable. Fabrics made from the same and dyed with a dye having an affinity therefor is found improved in light and acid fading over the same cellulose acetate stabilized by non-chemical methods.

It is to be understood that the foregoing detailed description is merely given by way of illustration and that many variations may be made therein without departing from the spirit of my invention.

Having described my invention, what I desire to secure by Letters Patent is:

1. Method of preparing stable organic acid esters of cellulose, which comprises mixing an organic acid ester of cellulose, dissolved in the organic acid solution in which it is formed and which contains sulphur compounds, with magnesium acetate, permitting said mixture to stand from 3 to 16 hours at 22° C., and then adding a diluent to said mixture with stirring whereby the organic acid ester of cellulose is precipitated while in contact with the whole of the magnesium acetate employed.

2. Method of preparing stable cellulose acetate, which comprises mixing cellulose acetate, dissolved in the organic acid solution in which it is formed and which contains sulphur compounds, with magnesium acetate, permitting said mixture to stand from 3 to 16 hours at 22° C., and then adding a diluent to said mixture with stirring whereby the cellulose acetate is precipitated while in contact with the whole of the magnesium acetate employed.

HERBERT E. MARTIN.